United States Patent
Fossum et al.

(10) Patent No.: US 6,584,235 B1
(45) Date of Patent: Jun. 24, 2003

(54) WIDE DYNAMIC RANGE FUSION USING MEMORY LOOK-UP

(75) Inventors: Eric R. Fossum, La Crescenta, CA (US); Abraham Kotlyar, La Crescenta, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/299,066

(22) Filed: Apr. 23, 1999

Related U.S. Application Data

(60) Provisional application No. 60/082,792, filed on Apr. 23, 1998.

(51) Int. Cl.[7] .............................. G06K 9/32; G09G 5/00; H04N 9/74
(52) U.S. Cl. ...................... 382/284; 382/295; 382/294; 382/293; 345/630; 345/629; 348/588; 348/584
(58) Field of Search .................................. 382/284, 294, 382/291, 292, 293, 295, 151, 206, 209, 216, 218, 219; 345/629, 635; 348/584, 588

(56) References Cited

U.S. PATENT DOCUMENTS

| | | | | |
|---|---|---|---|---|
| 5,325,449 A | * | 6/1994 | Burt et al. ................... 382/284 |
| 5,488,674 A | * | 1/1996 | Burt et al. ................... 382/284 |
| 5,511,155 A | * | 4/1996 | Yamaguchi .................. 395/133 |
| 5,828,793 A | * | 10/1998 | Mann .......................... 382/284 |
| 5,886,822 A | * | 3/1999 | Spitzer ........................ 359/630 |
| 6,075,905 A | * | 6/2000 | Herman et al. ............. 382/284 |

OTHER PUBLICATIONS

Eric R. Fossum, "Differential Non–Linearity Correction Scheme", U.S. patent application No. 09/170,944 filed Oct. 13, 1998.
Alexander I. Krymski, "Correction of Missing Codes Non-linearity in A to D Converters", U.S. patent application No. 09/169,020 filed Oct. 8, 1998.
Michael Kaplinsky, "Using Single Lookup Table to Correct Differential Non–linearity Errors in an Array of A/D Converters", U.S. patent application No. 09/304,526 filed May 5, 1999.
Eric R. Fossum, Sandor Barna, Daniel Van Blerkom, "Non-linear Flash Analog to Digital Converter Used in an Active Pixel System", U.S. patent application No. 09/161,355 filed Sep. 25, 1998.

* cited by examiner

*Primary Examiner*—Bhavesh Mehta
*Assistant Examiner*—Yosef Kassa
(74) *Attorney, Agent, or Firm*—Dickstein Shapiro Morin & Oshinsky LLP

(57) ABSTRACT

An image fusion is carried out using a look-up table. The look-up table is addressed by the different kinds of images that will be used to carry out the fusion. Each address in the look-up table contains a precomputed image fusion between the two different kinds of images.

12 Claims, 1 Drawing Sheet

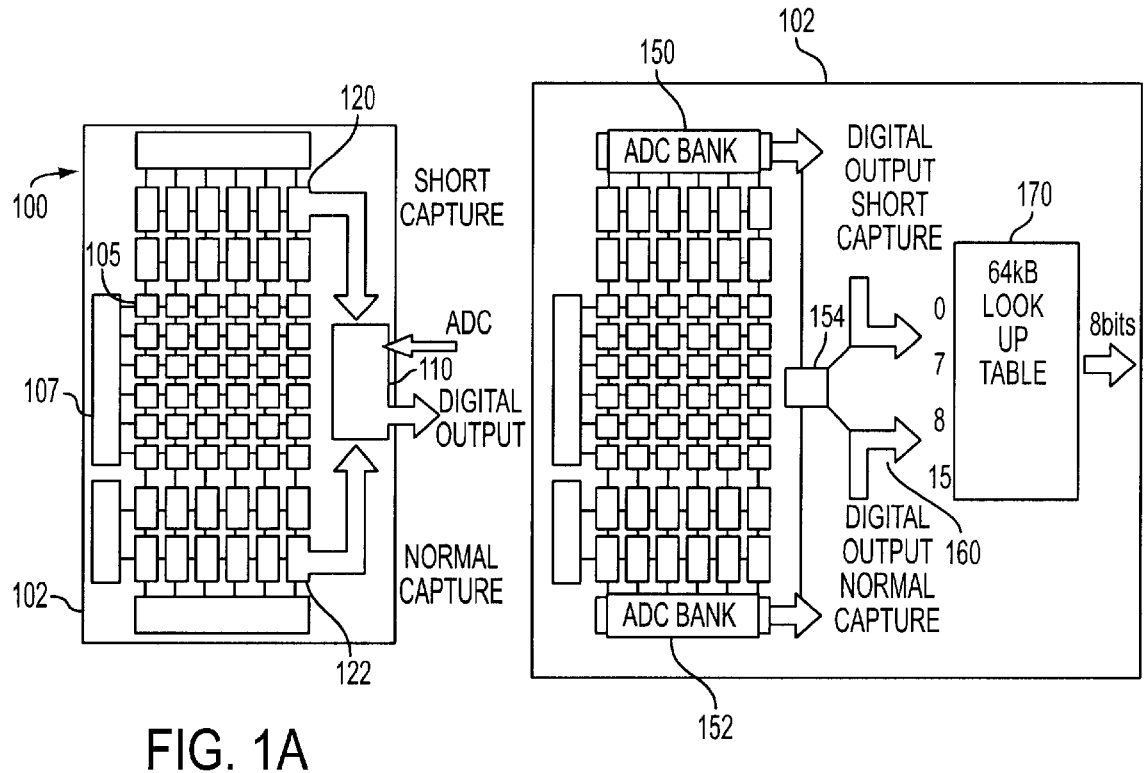
FIG. 1A
FIG. 1B
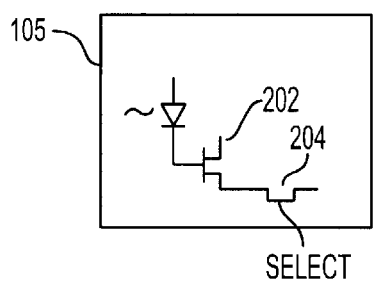
FIG. 2

WIDE DYNAMIC RANGE FUSION USING MEMORY LOOK-UP

CROSS REFERENCE TO RELATED APPLICATIONS

This application claims benefit of U.S. Provisional Application No. 60/082,792, filed on Apr. 23, 1998.

The present system teaches a way of carrying out fusion between images based on the specific content of the images.

BACKGROUND

Once a image is sensed, that image can be processed to obtain better information, i.e., information that is more pleasing to the eye. Many different image processing techniques and algorithms are well known. One known image processing technique is called image fusion. An example of image fusion is described in U.S. Pat. No. 5,488,674.

Image fusion combines two or more source images to form a single composite image with extended information content. Images from different sensors, such as infra-red and visible cameras, computer aided tomography (CAT) and magnetic resonance imaging (MRI) systems, can be, for example, combined to form the composite image. Multiple images of a given scene taken with different types of sensors, such as visible and infra-red cameras, or images taken with a given type of sensor and scene but under different imaging conditions, such as with different scene illumination or camera focus may be combined. Image fusion can be used to obtain useful information from the source images and to attempt to remove artifacts generated by the fusion process.

Different approaches are known to carry out image fusion. One approach aligns the source images, then sums, or averages, across images at each pixel position. This and other pixel-based approaches often field unsatisfactory results since individual source features appear in the composite with reduced contrast, or appear jumbled as in a photographic double exposure.

Known pattern-selective image fusion tries to overcome these deficiencies by identifying salient features in the source images and preserving these features in the composite at full contrast. Each source image is first decomposed into a set of primitive pattern elements. A set of pattern elements for the composite image is then assembled by selecting salient patterns from the primitive pattern elements of the source images. The composite image is constructed from its set of primitive pattern elements.

Burt, in Multiresolution Image Processing And Analysis, V. 16, pages 20–51, 1981, and Anderson, et al in U.S. Pat. No. 4,692,806 disclose an image decomposition technique in which an original comparatively-high-resolution image comprised of a first number of pixels is processed to derive a wide field-of-view, low resolution image comprised of second number of pixels smaller than the first given number. The process for decomposing the image to produce lower resolution images is typically performed using a plurality of low-pass filters of differing bandwidth having a Gaussian roll-off. U.S. Pat. No. 4,703,514, for example, has disclosed a means for implementing the pyramid process for the analysis of images.

While the Laplacian Pyramid technique has been found to provide good results, it too has some problems at times. Sometimes, for example, visible artifacts are introduced into the composite image.

SUMMARY

The present system uses a reconfigurable system that carries out the image fusion using an adaptable technique. Specifically, a look up table is used to obtain a predetermined image analysis. The look up table is preferably formed by making a predetermined image relationship between different parts, storing that in the look up table, and addressing those using the pixel values used to form the relationship.

BRIEF DESCRIPTION OF THE DRAWINGS

These and other aspects of the invention will now be described with reference to the attached drawings, in which:

FIGS. 1A and 1B respectively show first and second embodiments of the preferred system; and FIG. 2 shows a close up of a pixel.

DETAILED DESCRIPTION

Certain effects are possible in image processing by using a combination of a short and a long exposure. The two exposures each include different kinds of information about the scene being imaged.

The preferred system obtains two exposures of the same image for different lengths of time. A short exposure of e.g., 1 millisecond and a long exposure of e.g. 30 milliseconds are obtained one after the other, or at the same time. Both exposures therefore presumably represent substantially the same image.

Previous practices have used dedicated hardware to process the image using one technique. However, the inventors have noticed that each technique represents a tradeoff between various competing objectives.

The present system uses a reconfigurable system that carries out the image fusion using an adaptable technique. According to this system, the digital representation of the image is processed one piece at a time. According to this system, many different types of known data fusion techniques, including the summing technique, averaging technique, Laplacian technique described above, or any other fusion technique known in the art can be used. The effect of each of these data fusion techniques is dependent on the kind of image that is being processed. The embodiment determines an appropriate data fusion technique for a particular image in advance. The image is characterized, in this embodiment, by the way that the long exposure relates to the short exposure. The result of data fusion between each possible long exposure versus short exposure is stored in a look-up table.

For each pair of images (long and short) of x bits, a 2x-bit look-up table is used. Therefore, for example, using 8-bit images, a 16-bit look-up table is used for the overall data fusion technique.

The basic architecture is shown in FIGS. 1A and 1B. The chip 100 includes a substrate 102 with an active pixel type sensor formed therein. This device includes an array of photoreceptor pixels 105, controlled to produce their outputs by an on-chip controller 107. On-chip processing elements include at least a buffer transistor 202 and selection transistor 204 in each pixel, and on-chip ADC 110, and registers for the signals. In the preferred mode shown in FIG. 1A, a first register 120 is used to store the results from the short capture, and a second register 122 is used to store the results from the longer capture.

Both a long and short exposure image of the same scene are generated. For each pixel, the two exposures are then converted on-chip to two 8-bit words—one for each exposure. A variety of architectures can be used for the analog to digital conversion. In FIG. 1(a), one ADC block, containing one or two ADCs, is used to serially convert the two channels of pixel data. FIG. 1(b) shows a column parallel approach in which two banks of slower ADCs, respectively at the top and bottom of each column, digitize an entire row of pixels simultaneously. The outputs are then multiplexed into a serial output stream.

The two exposures are obtained on the chip substantially simultaneously. This can include one right after the other or exactly at the same time. The exposures can be obtained exactly at the same time by using the short capture buffer 120 to read, non-destructively, information from the pixels at a first time. The longer capture buffer is used to read the pixels after they have integrated for a longer time.

Each pixel is then processed using the A/D converter 110 to convert each exposure from each pixel to a n-bit digital word. The preferred mode described herein uses 8 bits for each exposure. Therefore, the two exposures are converted on-chip into two-8-bit words.

The embodiment shown in FIG. 1A shows a first A/D conversion architecture which uses a single A/D converter for the entire unit. This A/D converter is fast A/D converter such as a "flash" type. The system could alternatively use two flash A/D converters, one for the short capture and one for the normal capture.

FIG. 1B shows an alternative architecture in which a column parallel approach is used. A first A/D bank 150 is used to provide the digital output from the short captures. One A/D converter is provided for each row, hence outputting an entire column of information simultaneously. The second A/D bank 152 is used to obtain and convert the information from the normal capture. Therefore, entire rows of pixels are digitized substantially simultaneously.

An on-chip multiplexer 154 can be used to multiplex the digital data into a serial output stream 160. In this preferred mode shown in FIG. 1B, one of the A/D banks is at the top of the chip, and the other is at the bottom of the chip. This provides two different banks of A/D converters respectively at the top and bottom of the columns.

Once the two exposures are digitized, the two digital words are concatenated. This can be done either on-chip or off-chip. This 16-bit word includes all the information from both images. This concatenated word is used to address a look-up table (memory) 170.

Look-up Table 170 is pre-compiled with information for image fusion functions based on information that is precomputed for different image parts. Each image part is investigated by determining its values during long and short integrations. The information for the image fusion functions is precomputed and optimized for the different kinds of images obtained. For example, this include the results of the data fusion functions that are optimized for the given inputs.

Given these two-8-bit inputs, the image fusion determines the best output. The two dimensional array has X and Y indices 0–255 representing the $2^8$ different combinations obtained from the two different digital conversions. As an example, given an X and Y coordinate (the two exposures) say (200, 23) one locates the best possible fusion result. The amount of memory needed is $256^2$ or $2^{16}$, i.e., 64 Kbytes.

The look-up table can either be integrated on-chip with the sensor, or can be located as a separate off-chip piece.

A particularly preferred mode integrates rewritable memory on the substrate 102, as shown in FIG. 1B. This allows system updates, e.g., to change the fusion characteristics.

Another embodiment uses a multiple dimension look up table to allow more information to be programmed into the look up table. One preferred use of the multiple dimension look up table is for compensation of certain parts of the images. One preferred compensation is backlight compensation in the center portion of the image. This can be calculated by integration of multiple frames of live images with low pass filtering. The look up table is addressed using not only the image contents, but also the position of the images. This position can be a coarse position, e.g., center, edge, left, right, or a more detailed position, e.g., x and y coordinates.

Although only a few embodiments have been described in detail above, other embodiments are contemplated by the inventor and are intended to be encompassed within the following claims. In addition, other modifications are contemplated and are also intended to be covered.

For example, other kinds of image sensors can be used, and other resolutions are possible. The two addresses can be concatenated in different ways, e.g. MSBs of both exposures, then next-to-MSBs of each exposure. The look up table can also be set to determine information based on neighborhoods of the image, rather than one pixel at a time as explained above. This could, for example, use a 3×3×2 look-up table matrix for a 3×3 neighborhood.

What is claimed is:

1. An image processing system, comprising:
    an image sensor, including an array of pixels that have units including rows and columns, arranged logically, each pixel including active pixel sensor, including an in-pixel buffer, and in-pixel selector, each pixel also including a photoreceptor which produces an output signal indicative of image information that is applied thereto;
    a controller element on the same image substrate with said image sensor, and controlling outputs of said pixels;
    first and second register elements, respectively receiving output signals from said pixels, including at least a first register element holding an output of said pixel for a longer period of capture and a second register element holding an output of the same pixel for a shorter period of capture;
    a look-up table memory, storing information indicative of an image fusion between different kinds of results for long and short captures, said look-up table memory being addressed with information from said first and second registers and outputting an image fusion result based on contents of said first and second registers.

2. A system as in claim 1, wherein said information comprises a concatenation of the output of said first and second registers on a pixel-by-pixel basis.

3. A device as in claim 2, wherein said look up table memory is on the same substrate with said image sensor.

4. A device as in claim 2, further comprising at least one A/D converter, digitizing outputs of said image sensor.

5. A device as in claim 4, further comprising a first A/D converter digitizing results from said shorter capture, and a second A/D converter, digitizing results from said longer capture.

6. A device as in claim 5, wherein each of said first and second A/D converters includes a single fast A/D converter.

7. A device as in claim 5, wherein each of said first and second A/D converters includes a plurality of a/D converters, each associated with one unit of said array.

8. A system as in claim 1, wherein said look up table has more than two dimensions.

9. A system as in claim 8, wherein one of said dimensions represents a location in the image.

10. A method of determining fusion information, comprising:
   obtaining information about two different capture lengths of an image, one which is a shorted capture length and the other of which is a longer capture length;
   converting said information into first and second digital groups of bits in first and second register elements;
   obtaining a look-up table which is prestored with image fusion information based on said predetermined capture lengths; and
   using said first and second digital words to address the information in the look-up table to thereby read-out the information in the look-up table.

11. A method of determining fushion information, comprising:
   obtaining information about two different capture lengths of an image, one of which is shorter capture length and the other of which is a longer capture length;
   converting said information into first and second digital groups of bits in first and second register elements;
   obtaining a look-up table which is prestored with image fushion information based on said predetermined capture lengths; and
   using said first and second digital groups to bits to address the information in the look-up table to thereby read-out the information in the look-up table.

12. A system as in claim 11, wherein one of said dimensions represents a location in the image.

* * * * *

UNITED STATES PATENT AND TRADEMARK OFFICE
CERTIFICATE OF CORRECTION

PATENT NO. : 6,584,235 B1
DATED : June 24, 2003
INVENTOR(S) : Eric R. Fossum et al.

It is certified that error appears in the above-identified patent and that said Letters Patent is hereby corrected as shown below:

Title page,
Item [56], References Cited, U.S. PATENT DOCUMENTS, add:
-- 5,991,444  A *  11/1999  Burt et al. …… 382/232 --

Column 3,
Line 51, "include" should read -- includes --.

Column 4,
Line 62, "a/D" should read -- A/D --.

Column 5,
Line 4, "shorted" should read -- shorter --.
Line 11, "words" should read -- groups of bits in first and second register elements --.

Column 5, lines 14-15 through Column 6, lines 1-11,
Cancel the claim and insert the following claim:
    11. An image processing system, comprising:
    an image, sensor including an array of photosensors, obtaining information indicative of two different images including at least a shorter capture image and a longer capture image;
    a memory, storing a predetermined relationship between different kinds of information in said at least two different image aspects, and a fusion between said shorter capture image and said longer capture image;
    at least one A/D converter, converting said image information to a digital signal, and connceting said digital signal to said memory to reda information therefrom including a look up table which has more than two dimensions.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,584,235 B1
DATED : June 24, 2003
INVENTOR(S) : Eric R. Fossum et al.

It is certified that error appears in the above-identified patent and that said Letters Patent is hereby corrected as shown below:

<u>Column 5, lines 14-15 through column 6, lines 1-11</u>,
cancel the claim and insert the following claim:

-- 11. An image processing system, comprising:
    an image sensor, including an array of photosensors, obtaining information indicative of two different images including at least a shorter capture image and a longer capture image;
    a memory, storing a predetermined relationship between different kinds of information in said at least two different image aspects, and a fusion between said shorter capture image and said longer capture image;
    at least one A/D converter converting said image information to a digital signal, and connectinig said signal to said memory to read information therefrom including a look up table which has more than two dimensions.

Signed and Sealed this

Fifth Day of October, 2004

JON W. DUDAS
*Director of the United States Patent and Trademark Office*